(12) United States Patent
Uyeki et al.

(10) Patent No.: US 8,942,919 B2
(45) Date of Patent: Jan. 27, 2015

(54) BEV ROUTING SYSTEM AND METHOD

(75) Inventors: Robert M. Uyeki, Torrance, CA (US); Naoya Miyamoto, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 982 days.

(21) Appl. No.: 12/913,077

(22) Filed: Oct. 27, 2010

(65) Prior Publication Data
US 2012/0109515 A1 May 3, 2012

(51) Int. Cl.
G01C 21/36 (2006.01)
G01C 21/00 (2006.01)
G06F 7/00 (2006.01)
G01C 21/34 (2006.01)

(52) U.S. Cl.
CPC ................... *G01C 21/3469* (2013.01)
USPC ........... 701/423; 701/439; 701/400; 701/414; 701/22

(58) Field of Classification Search
CPC .... G01C 21/3605; G01C 21/20; G01C 21/36; G01C 21/12; G06F 9/4831; G06F 3/0482; G06F 19/36; G06F 11/00; B60W 2540/10; B60W 10/06; B60W 20/40; B60W 10/26
USPC .............. 701/22, 35, 33.4, 414, 33, 423, 439, 701/410, 428, 431; 180/65.235, 65.25, 180/65.265, 65.21, 65.275, 65.22; 320/132; 705/16
See application file for complete search history.

(56) References Cited

U.S. PATENT DOCUMENTS

| | | | | |
|---|---|---|---|---|
| 5,778,326 A * | 7/1998 | Moroto et al. ................... 701/22 | | |
| 5,790,976 A | 8/1998 | Boll et al. | | |
| 5,815,824 A | 9/1998 | Saga et al. | | |
| 6,470,983 B1 * | 10/2002 | Amano et al. ........... 180/65.235 | | |
| 6,487,477 B1 * | 11/2002 | Woestman et al. .............. 701/22 | | |
| 7,761,203 B2 * | 7/2010 | Yamada ........................ 701/33.4 | | |
| 7,865,298 B2 * | 1/2011 | Macneille et al. ............ 701/414 | | |
| 8,022,674 B2 * | 9/2011 | Miura ............................ 320/132 | | |
| 8,301,323 B2 * | 10/2012 | Niwa ............................... 701/22 | | |
| 8,306,736 B2 * | 11/2012 | Wu ................................ 701/410 | | |
| 8,849,485 B2 * | 9/2014 | Christ ............................. 701/22 | | |
| 2007/0294026 A1 | 12/2007 | Schirmer | | |
| 2008/0040016 A1 | 2/2008 | Fujishiro | | |
| 2008/0119982 A1 * | 5/2008 | Yamada .......................... 701/35 | | |
| 2008/0215238 A1 * | 9/2008 | Geelen et al. ................. 701/210 | | |
| 2009/0012664 A1 * | 1/2009 | Christ ............................. 701/22 | | |
| 2009/0259363 A1 | 10/2009 | Li et al. | | |
| 2009/0277701 A1 * | 11/2009 | Soma et al. ................. 180/65.25 | | |
| 2010/0010697 A1 | 1/2010 | Soma et al. | | |
| 2010/0094533 A1 * | 4/2010 | Wu ................................ 701/200 | | |
| 2011/0246004 A1 * | 10/2011 | Mineta ............................ 701/22 | | |
| 2011/0246010 A1 * | 10/2011 | de la Torre Bueno .......... 701/22 | | |
| 2011/0246019 A1 * | 10/2011 | Mineta ............................ 701/33 | | |
| 2011/0246055 A1 * | 10/2011 | Huck et al. .................... 701/201 | | |
| 2012/0005031 A1 * | 1/2012 | Jammer ........................... 705/16 | | |
| 2012/0101716 A1 * | 4/2012 | Kim ............................... 701/408 | | |

FOREIGN PATENT DOCUMENTS

JP 2001-112121 4/2001

* cited by examiner

*Primary Examiner* — Calvin Cheung
*Assistant Examiner* — Luis A Martinez Borrero
(74) *Attorney, Agent, or Firm* — Fay Sharpe LLP

(57) ABSTRACT

A battery electric vehicle (BEV) navigation routing system and routing methods are presented, in which a traveling route is determined from the current vehicle location to the destination location by preferentially selecting low speed routes over higher speed routes if the present state of charge of the vehicle battery is insufficient to reach the destination location using shortest time or shortest distance routes.

20 Claims, 5 Drawing Sheets

BEV ROUTING SYSTEM AND METHOD

BACKGROUND

The present disclosure relates generally to battery electric vehicles (BEVs), and to navigation systems thereof for providing routing selections based on user-entered destination information. Because electric vehicles (EVs) have only recently been introduced in mainstream market channels, electric vehicle charging infrastructure is limited in the United States and elsewhere. Hybrid electric vehicles (HEVs) include hybrid technology allowing the vehicle to operate using fossil-fuel for propulsion and battery charging, and some electric vehicle designs provide an on-board internal combustion engine dedicated to driving a generator to charge the EV battery. If on-board propulsion or charging facilities are unavailable and the EV presently has a low state of charge (SOC) for the electric propulsion system, the vehicle must be brought to a charging station before the battery is completely depleted. Many modern vehicles are equipped with on-board navigation systems with global position system (GPS) capabilities. A user enters a desired destination and the navigation system determines a driving route from the current vehicle position to the destination. These systems typically select the route based on shortest distance or soonest arrival time. Advanced vehicle navigation systems obtain road congestion information and may modify the route selection according to such road conditions in order to implement a shortest distance or shortest travel time strategy. However, conventional navigation systems and travel time minimization type route selection techniques do not optimally accommodate the specific needs of BEVs. For instance, if the vehicle battery requires charging, the vehicle must be brought to a charging station. If no charging station is available or within reachable range, the vehicle may go into a power down mode with reduced acceleration and speed, and will eventually stop, in which case the vehicle should be directed off the road ahead of time. Moreover, the vehicle battery may become damaged if such power down events are repeated many times. Thus, there is a need for improved vehicle navigation systems and route techniques for BEVs to mitigate power down situations and to facilitate routing the vehicle to the desired destination without intervening stops for charging.

SUMMARY

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. Vehicle navigation techniques and systems are disclosed in which high congestion/low speed routes are preferentially selected to reduce energy consumption in battery electric vehicles. These concepts may be advantageously employed to facilitate BEV travel to user-entered destinations using available battery energy while mitigating the need for extra battery charging stops or power down events.

A battery electric vehicle is disclosed, having a battery, an inverter with a DC input and an AC output, and an electric motor providing drive power to one or more vehicle wheels for propelling the vehicle. A vehicle navigation system is provided to determine a traveling route from a current vehicle location to a destination location at least partially according to the present state of charge of the vehicle battery. If the present SOC is insufficient to reach the destination using shortest time or shortest distance routes, the navigation system preferentially selects low speed routes over higher speed routes in determining the traveling route. The purposeful routing into congested or slower traffic is contrary to conventional route searching/selection strategies that instead attempt to minimize travel time by selecting higher speed roads and avoiding congestion.

In certain embodiments, the navigation system preferentially selects congested routes according to present road congestion information and/or preferentially selects low speed routes based on route speed limit information. The system in certain embodiments may also recommend low speed lanes over higher speed lanes of a given multi-lane road and/or recommend exiting or avoiding high occupancy vehicle (HOV) lanes (e.g., so-called "car pool" lanes) when the present state of charge value is insufficient to reach the destination location using shortest time or shortest distance routes.

In certain embodiments, the navigation system notifies the user that low speed routes are being preferentially selected over higher speed routes because the present state of charge value is insufficient to reach the destination location using shortest time or shortest distance routes. The navigation system in certain embodiments, moreover, determines a traveling route to direct the vehicle to a charging station or other point of interest when the SOC is insufficient to reach the destination location using the low speed routes or the higher speed routes.

A method is provided for determining a BEV route, in which the present SOC, vehicle position, and destination location are obtained, and a determination is made as to whether the remaining SOC is sufficient to reach the destination location using shortest time or shortest distance routes. If not, a traveling route is determined from the current vehicle location to the destination location by preferentially selecting low speed routes over higher speed routes. In certain embodiments, the method includes notifying an occupant that the low speed routes are being used because of the SOC insufficiency. Certain embodiments, moreover, include determining a traveling route to direct the vehicle to a charging station or other point of interest if the SOC is insufficient to reach the destination location using the low speed routes or the higher speed routes.

Certain embodiments include preferentially selecting congested routes based at least in part on road congestion information and/or selecting low speed routes at least partially according to route speed limit information.

Certain embodiments also include preferentially recommending low speed lanes over higher speed lanes and/or recommending exiting or avoiding high occupancy vehicle lanes when the SOC is insufficient to reach the destination location using shortest time or shortest distance routes.

BRIEF DESCRIPTION OF THE DRAWINGS

The following description and drawings set forth certain illustrative Implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1A:
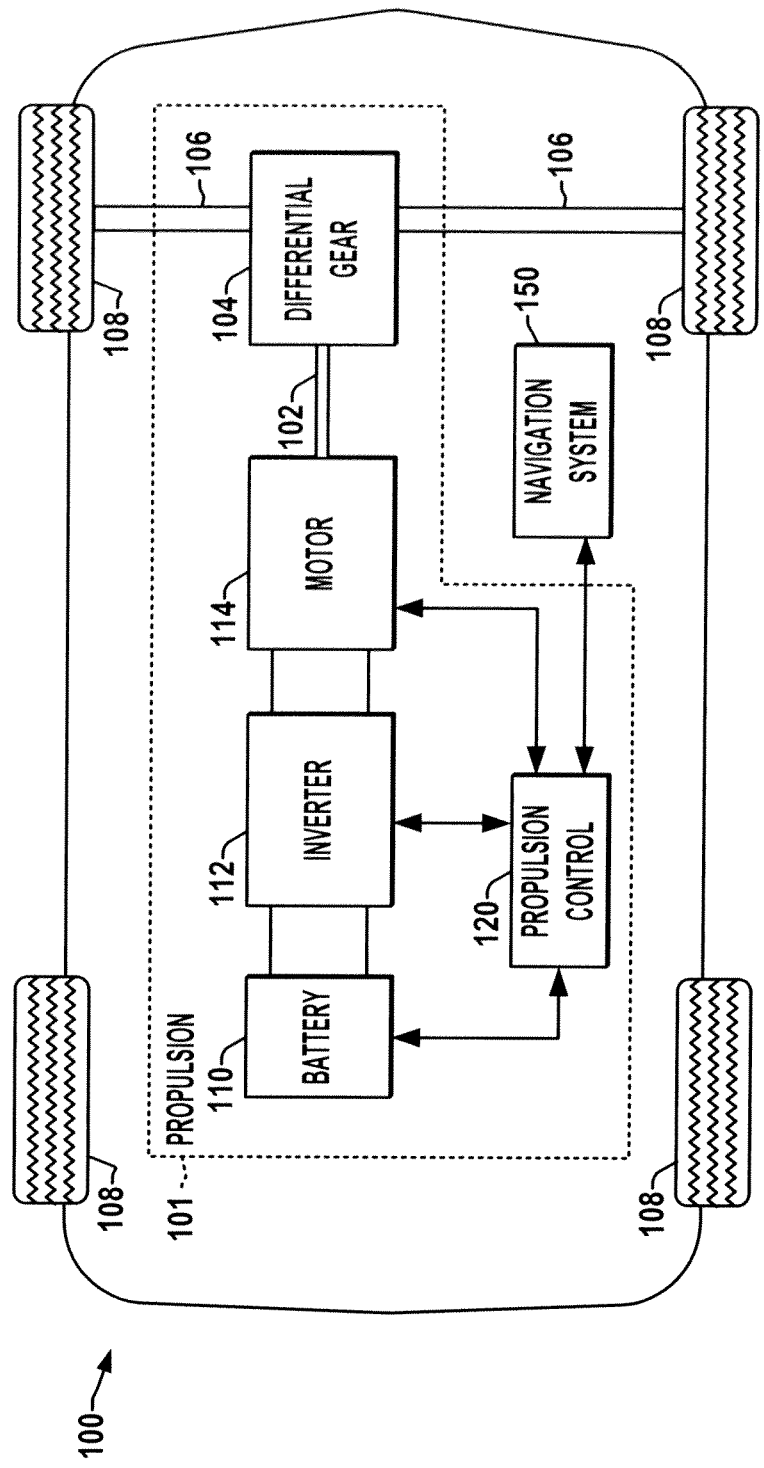
FIGS. 1A and 1B illustrate an exemplary battery electric vehicle (BEV) having an improved on-board navigation system in accordance with one or more aspects of the present disclosure.

One or more embodiments or implementations are hereinafter described in conjunction with the drawings, where like reference numerals are used to refer to like elements throughout, and where the various features are not necessarily drawn to scale. The disclosure relates to battery electric vehicles (BEVs), and to navigation system routing selections preferentially choosing slower routes when the current state of charge (SOC) is low relative to a user-specified destination, in contrast to conventional routing approaches that select routes utilizing carpool lanes and freeways to avoid congestion and reduce travel time. The inventor has appreciated that, unlike internal combustion engine-based vehicles and hybrid vehicles, BEV energy consumption is greater at high speeds, and thus the energy consumed per mile is higher for free flowing traffic situations than for congested roads. The disclosed systems and processes advantageously alter planned navigation routes to preferentially select/recommend routes with high congestion and/or lower speed limits to conserve energy when the battery SOC is low. The disclosure further contemplates preferential selection of non-carpool lanes on a freeway, selection of congested surface roads instead of free flowing highways, and selection of low speed alternatives instead of higher speed routes to thereby conserve BEV battery power with respect to routing the vehicle to a given destination.

Figure 1B:
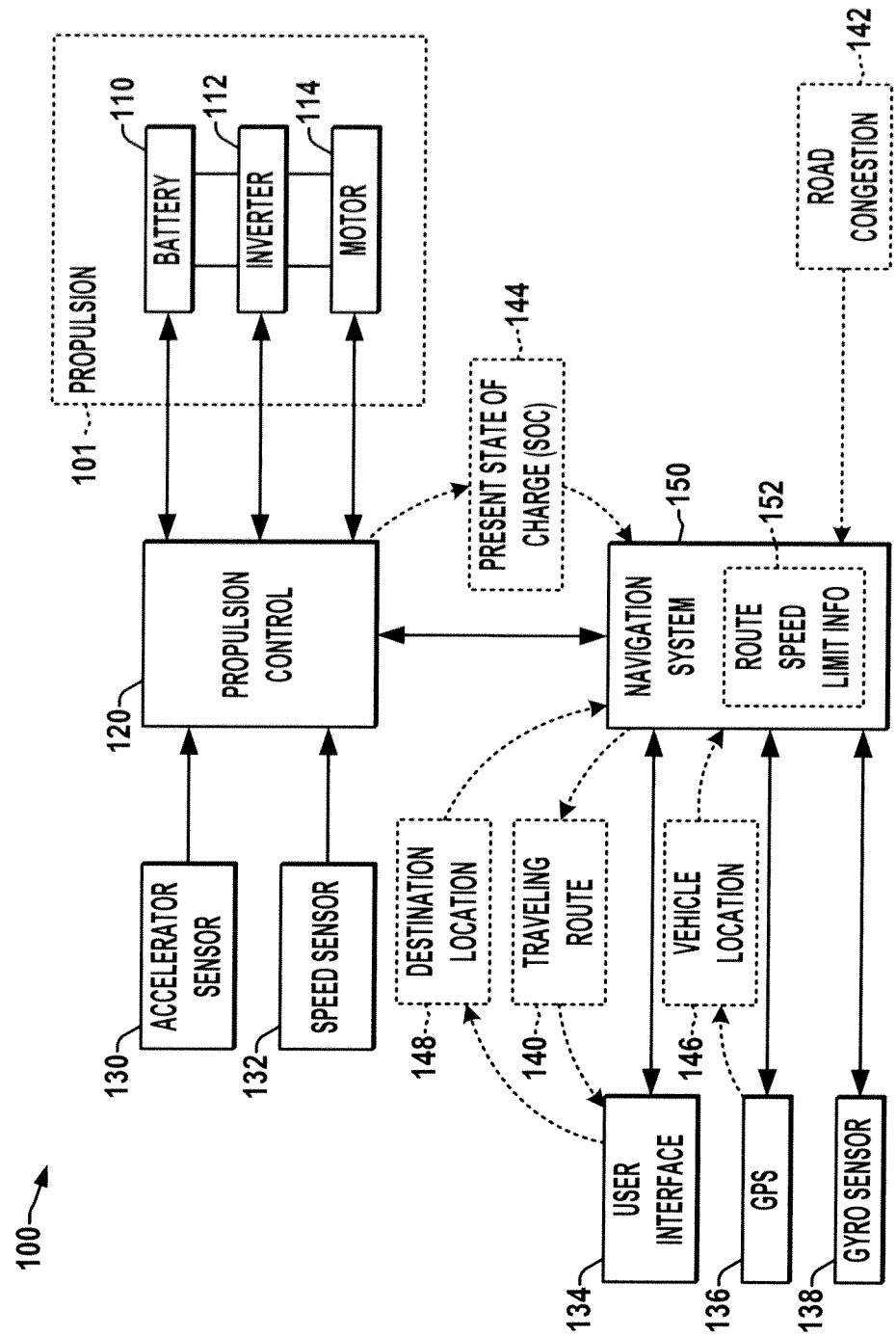

Referring initially to FIGS. 1A and 1B, an exemplary battery electric vehicle (BEV) 100 is illustrated having an improved on-board navigation system 150 in accordance with one or more aspects of the present disclosure. The BEV 100 includes a propulsion system 101 having an electric motor 114 with a shaft 102, a front wheel drive axle 106 and a differential gear 104 for propelling the vehicle 100 via wheels 108. The propulsion system 101 further includes a battery 110 providing DC current to an inverter 112, which in turn provides AC current to the motor 114 coupled by output shaft 102 with the axle 106 via the differential gear 104. The electric motor 114 drives the shaft 102 to transfer motive power to the differential gear 104, which transmits the motive power to the front wheels 108 by the axle 106 to propel the vehicle 100. One or more additional gears (not shown) may be included.

The battery 110 can be any suitable single or multiple battery configuration to supply DC power to the motor 114, for example, a nickel metal hydride, lithium ion, or similar battery, and DC-DC boost circuitry such as a DC-DC converter (not shown) may be included to adjust the DC output of the battery 110 to any level suitable for providing an input to the inverter 112. The inverter 112 receives the DC power directly or indirectly from the battery 110 and converts it to AC voltage to control the drive motor 114 to drive front wheels 108, and the drive system may include one or more alternative charging means for charging the battery 110, for example, where the motor 114 may operate as a generator during vehicle braking to convert rotational energy from the wheels 108 into electrical energy, with the inverter 112 or other circuitry converting such power to DC current to charge the battery 110.

Referring also to FIG. 1B, a propulsion controller 120 controls the inverter 112 according to driver inputs from an accelerator pedal sensor 130, a speed sensor 132, and/or a cruise control function or brake pedal sensor or other sensors (not shown) associated with the vehicle 100, and may include or be operatively coupled with a cruise control system (not shown). The propulsion controller 120 can be implemented as any suitable hardware, processor-executed software, processor-executed firmware, programmable logic, or combinations thereof, operative as any suitable controller or regulator by which the motor 114 and/or the inverter 112 can be controlled according to one or more desired operating values such as speed setpoint(s). The controller 120 obtains a state of charge (SOC) signal or value from the battery 110 or from a controller associated therewith (not shown). The propulsion control unit 120 in certain embodiments calculates an output that the driver requests via the accelerator pedal position sensor 130 or from a cruise control unit (not shown) and determines the vehicle speed from an output signal or value provided by the speed sensor 132. From these, the propulsion controller 120 determines a required driving power for controlling the inverter 112 and thus the motor 114, where the inverter control can include one or both of speed control and/or torque control, as well as other motor control techniques.

A navigation unit 150 communicates with a user interface 134 having a display and audio output capability, as well as user input devices such as buttons, touch-screen display controls, voice activation features, etc. The navigation system 150 operates according to user-entered destination 148 and preferences information, and also interfaces with a GPS system 136 to ascertain the current vehicle position 146. The navigation system 150 may also receive inputs from one or more further sensors, such as a gyro sensor 138 and also communicates with the propulsion controller 120, for instance, to obtain current vehicle speed information and status information regarding the battery 110, the inverter 112, and the motor 114. The navigation system 150 can be implemented as any suitable hardware, processor-executed software, processor-executed firmware, programmable logic, or combinations thereof, and may be integrated with the propulsion control system 120 or with other systems of the vehicle 100. The navigation system 150 in certain embodiments provides a display (e.g., FIGS. 4 and 5 below) showing a map rendering or other depiction of the current vehicle position on road map via the user interface 134.

The navigation system 150 may be further operative to obtain traffic information such as road congestion information 142 (FIG. 1B), road condition information, and other navigation information from external sources, for instance, via wireless communications apparatus of the vehicle 100 (not shown). In this manner, the navigation system 150 can compute and utilize road congestion information 142 for route selection and can provide graphical overlays on the user interface display 134 to indicate a congested area on road map data. Moreover, as explained further below, the system can obtain the present battery state of charge value 144 from the propulsion controller 120 and use the SOC 144, the desired destination 148, the current vehicle location 146, and the road congestion information 142 in determining one or more traveling routes 140 for directing the vehicle 101 to the destination 148, such as by providing visible maps and/or audible navigation instructions to the operator of the vehicle 100 while driving.

In operation, the navigation system 150 performs a navigation operation to search for or otherwise determine the traveling route 140 extending from the current position 146 to the destination 148 and displays the selected route 140 to the vehicle operator via the user interface 134. The system 150 may further provide audio driving instructions for the driver to navigate along the selected route 140 without having to visually monitor the displayed map on the interface 134. The navigation features may also provide for current lane monitoring and lane selection using the GPS system 136 to determine the current lane on a multi-lane road, with the display and/or audio output of the user interface 134 indicating to the user the proper (preferred) lane to be in and further indicating when a lane change is needed to continue on the selected route 140. The navigation system 150, moreover, may include onboard database of road information from which the selected route 140 is derived by any suitable searching algorithms, and/or the system 150 may access external data stores with such information to perform the route determination functions. In particular, the system 150 in certain embodiments includes route speed limit information 152 (FIG. 1B) listing the established speed limits for a given road section, which the system 150 can utilize in determining a route 140 for presentation and use by the driver.

The navigation system 150 receives the destination 148 from an operator, for instance, using the interface 134, or can obtain the destination from another vehicle system or external system, such as a database of certain points of interest providing destination locations or for emergency routing to a hospital or other location 148. In certain embodiments, the navigation system 150 searches for a traveling route 140 extending from the current vehicle location 146 obtained from the GPS system 136 to the destination 148, divides the traveling route into segments, and may associate one of a plurality of traveling modes with each segment of the segmented traveling route 140. In certain embodiments, the navigation system 150 determines multiple candidate routes 140 and displays these to the user via the interface 134, allowing the driver to select a candidate for use in routing to the destination 148.

Figure 2:
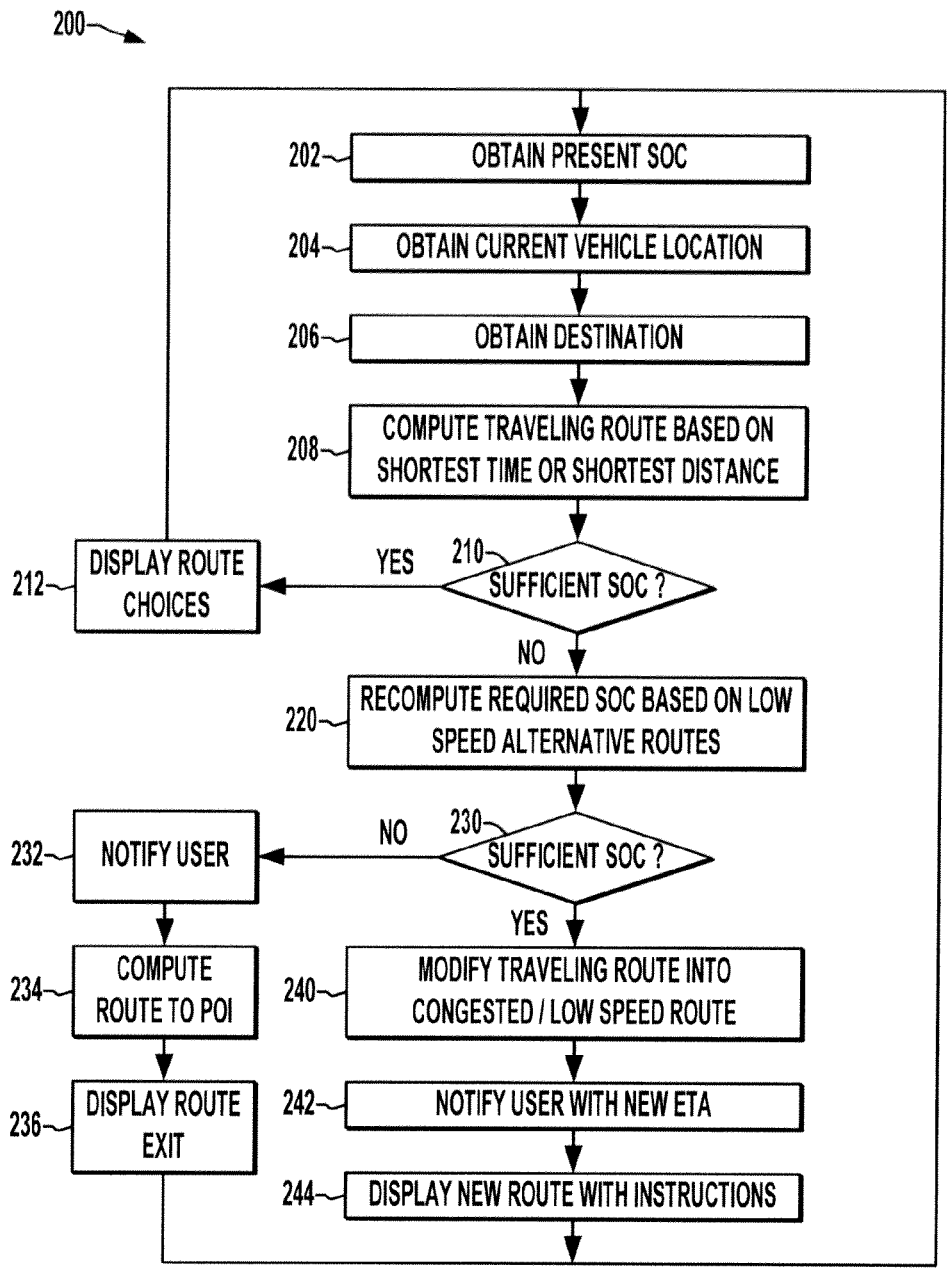
FIG. 2 is a flow diagram illustrating an exemplary route selection process for a BEV navigation system according to various aspects of the disclosure.
Figure 3:
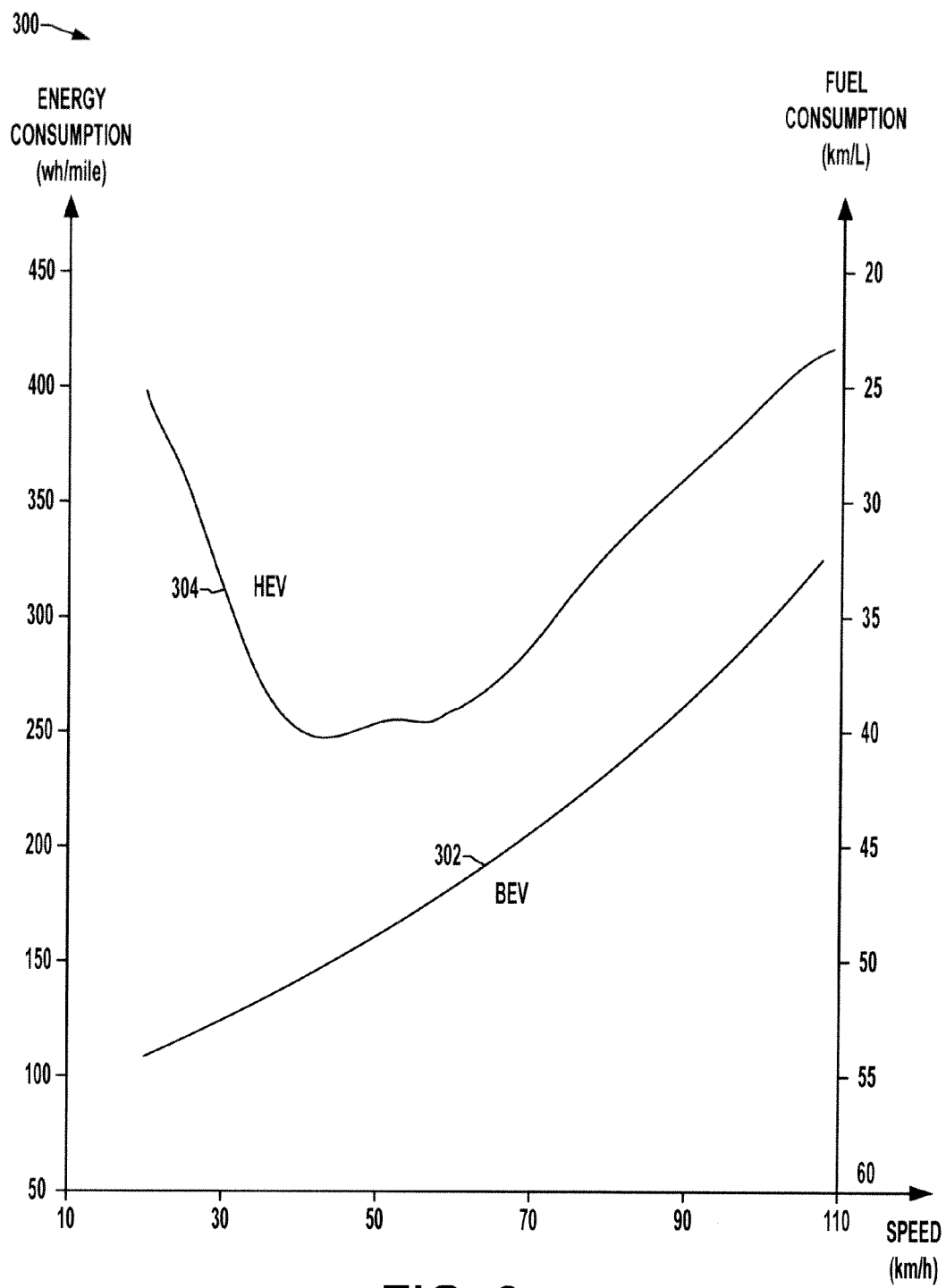
FIG. 3 is a graph showing energy and fuel consumption curves for exemplary hybrid electric and battery electric vehicles.

Referring also to FIGS. 2-5, the exemplary vehicle 100 and the navigation system 150 thereof provide for intelligent energy usage depending on the present battery SOC to facilitate, when possible, travel to a selected destination 148 without intervening charging or power down events. In particular, the navigation system 150 in certain embodiments operates generally according to a route selection process 200 illustrated in FIG. 2, in which high congestion and/or low speed routes are preferentially selected to reduce energy consumption and effectively extend the service range of battery electric vehicles (BEVs). In this regard, FIG. 3 shows a graph 300 with exemplary energy and fuel consumption curves 302 and 304 for battery electric and hybrid electric vehicles, respectively. As seen in the graph 300, the curve 302 shows that BEVs 100 have less energy consumption per mile at slower speeds, whereas HEVs (and vehicles powered exclusively by internal combustion engines) are more efficient at higher speeds than at lower speeds. Moreover, addition of regenerative braking effects in BEVs can decrease the energy consumption further. Using the current traffic condition information 142, road speed limit information 152, the current vehicle position 146, and the destination 148, the system 150 can determine prospective energy usage and compare this to the current SOC value 144 for selectively routing into congestion or slow speed routes to reach the final destination 148, if possible, without charging, where the charge consumption characteristics of the BEV 100 are advantageously exploited by this intelligent route selection technique 200.

As shown in FIG. 2, the process 200 includes obtaining the present state of charge value 144 at 202, for instance, where the propulsion controller 120 in certain embodiments provides the SOC value 144 periodically to the navigation system 150. The system 150 thus knows the remaining amount of energy stored in the battery 110 at any given time. At 204, the navigation system 150 obtains the current vehicle location 146, for instance, from the GPS system 136, and obtains the destination location 148 at 206, for example, from the user interface 134 or other source. At 208, one or more traveling routes are computed (e.g., by suitable searching algorithm) based on conventional shortest time or shortest distance criteria.

Figure 4:
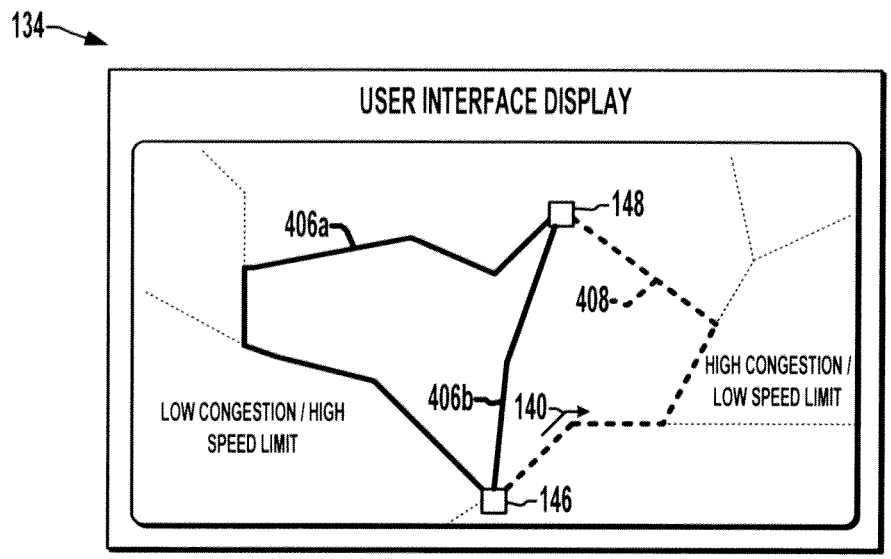
FIGS. 4 and 5 are front elevation views illustrating an exemplary user interface display for the BEV navigation system.

FIG. 4 shows an exemplary display screen of the user interface 134 for the BEV navigation system 150, in which the vehicle 100 is currently at a location 146 and the designated destination location 148 can be achieved using several different routes, one or more of which may include multiple different roads. A first illustrated route 406a is the longest travel distance, but uses high speed roadways (e.g., mostly highways) that are currently uncongested according to the current road congestion information 142. A second exemplary route 406b is the shortest distance, but the estimated travel time from location 146 to location 148 by this route 406b is longer than that of route 406a. A third possible route 408 (shown in dashed line in FIG. 4) involves mostly low speed limit roads (e.g., according to the speed limit information 152 in FIG. 1B) and/or currently has a high amount of congestion (e.g., according to the congestion information 142). The traveling route selection at 208 in FIG. 2 using conventional shortest time or shortest distance criteria in this example will select one of the routes 406a or 406b, and will not present the route 408 to the user.

A determination is made at 210 by the navigation system 150 as to whether the current SOC value 144 for the vehicle 100 meets or exceeds the estimated charge expenditure for the selected higher speed routes 406. If so (YES at 210), the system 150 displays the route choices (e.g., routes 406a and/or 406b) to the vehicle occupant via the user interface 134.

If, however, the present state of charge value 144 is insufficient to reach the destination location 148 using shortest time or shortest distance routes 406 (NO at 210), the navigation system 150 proceeds at 220 to recompute the SOC required to make the desired trip based on lower speed alternative route(s) (e.g., route 408 in the example shown in FIG. 4). A determination is made at 230 as to whether the current SOC value 144 meets or exceeds the amount required to traverse the selected lower speed/congested route 408. If the present SOC 144 is insufficient to reach the destination location 148 using the low speed routes 408 or the higher speed routes 406 (NO at 230), the user is notified at 232 and the system 150 determines a traveling route 140 at 234 to direct the vehicle 100 to a charging station or other point of interest, and the appropriate route exit instructions are displayed or otherwise provided to the user at 236.

If, however, there is enough SOC to reach the destination location 148, but only by slower travel speeds (YES at 230), the route 408 is selected and the traveling route is modified at 240 so as to effectively route the vehicle 100 (e.g., through screen prompts and/or audible instructions to the user) along the congested and/or low speed limit path 408. At 242 in the example of FIG. 2, the system 150 notifies the user of the rerouting and may provide the user with an updated estimated time of arrival (ETA), and the new route 140 and associated instructions are rendered to the user at 244. In certain embodiments, the system 150 may notify the user (e.g., at 242) via the interface 134 that the low speed routes 408 are being preferentially selected over higher speed routes 406 because the present state of charge value 144 is insufficient to reach the destination location 148 using shortest time or shortest distance routes 406. The system 150 may further offer the user the option to instead choose to route to a charging station for intervening charging operation prior to reaching the destination 148.

By this process 200, the navigation system 150 thus attempts to minimize the energy consumption to extend the travel range of the vehicle 100 when there is no charge station available or when the user wants to proceed (if possible) to the destination 148 before charging. The system 150 can thus advantageously create and present a BEV-specific energy consumption map depending on the current battery SOC and the selected destination 148 using real time traffic conditions 142 and surface street speed limit information 152. The navigation system 150 thus detects a low SOC condition in the context of a currently selected destination 148 and the possible routing options (e.g., options 406a, 406b, and 408 in the example of FIG. 4), and responds by generating one or more proposed low consumption alternate routes (e.g., route 408) for presentation to the user, and may provide suitable user interface prompting to allow the user to proceed to modify the selected route 140. In addition, the user is notified if a selected destination is impossible altogether at 232, whereupon the user can be navigated to a safe area to wait for a tow truck. The system 150 can also recommend routing selections and vehicle operating instructions to employ regenerative braking (or instructions to turn off air conditioning, radios, or other non-essential, electricity-consuming vehicle options) to further decrease the energy consumption and thereby facilitate the possible achievement of the destination 148. The disclosure finds particular utility in low SOC situations in which no charging stations are nearby or in which the user instead prefers to charge the BEV 100 at the end destination 148. In these conditions, the navigation system 150 provides selections/recommendations to route the vehicle 100 into higher congestion and/or lower speed limit roads.

Figure 5:
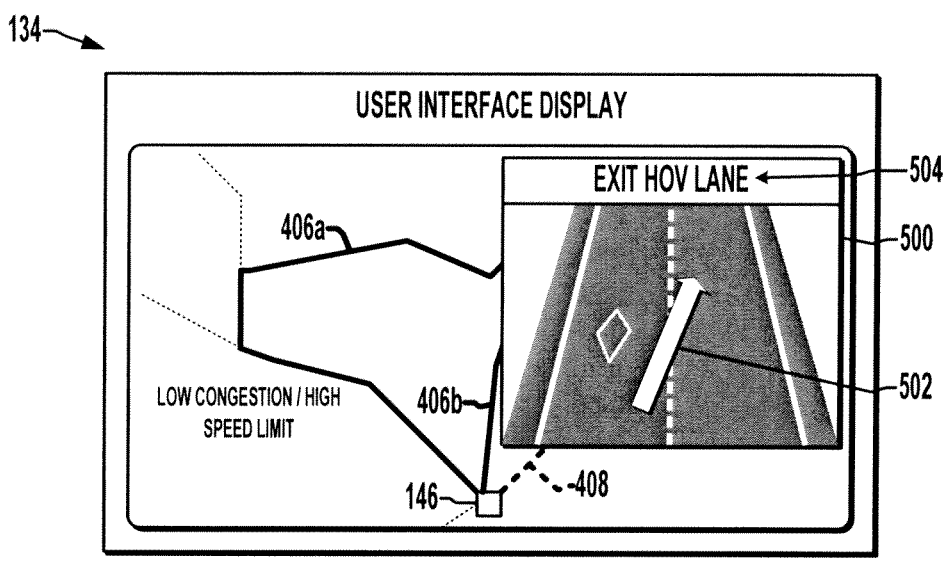

Referring also to FIG. 5, moreover, the system 150 may advantageously provide recommendations to exit and/or avoid available carpool lanes to reduce energy consumption. In this manner, the system 150 in certain embodiments preferentially recommends low speed lanes over higher speed lanes of a given multi-lane road when the SOC value 144 is insufficient to reach the destination location 148 using shortest time or shortest distance routes 406. FIG. 5 illustrates a situation in which the BEV 100 is traveling along a highway allowing selective access (even with single occupant) to so-called carpool lanes or High Occupancy Vehicle (HOV) Lanes. In conventional route selection processing with sufficient SOC, the navigation system 150 would route the driver into the carpool lane to avoid congestion and reduce travel time. If, however, the SOC value 144 is low, the system 150 preferentially recommends exiting or avoiding the HOV lane when the present state of charge value 144 is insufficient to reach the destination location 148 using shortest time or shortest distance routes 406. FIG. 5 illustrates an exemplary embodiment of the user interface display in which the navigation system 150 accordingly provides a pop-up window view 500 (overlaid on the normal map view) showing an arrow indicia 502 and written instructions/recommendations 504 (possibly accompanied by corresponding audible instructions) telling the driver to exit the HOV lane. In this situation, the system 150 may also provide suitable visible and/or audible instructions telling the user to avoid entering high speed or HOV lanes in order to reduce energy consumption.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A battery electric vehicle, comprising:
   a propulsion system, comprising:
      a battery with a DC output,
      an inverter with a DC input and an AC output, the inverter operative to convert DC power from the battery to provide AC electrical power to the AC output, and
      an electric motor having an output shaft providing mechanical power To drive at least one wheel for propelling the vehicle using AC power generated by the inverter; and
   a navigation system operative to determine a traveling route for the battery electric vehicle extending from a current vehicle location to a destination location based at least in part on a present state of charge value indicating a remaining amount of energy stored in the battery, where the navigation system preferentially selects low speed routes over higher speed routes in determining the traveling route when the present state of charge value is insufficient to reach the destination location using shortest time or shortest distance routes.

2. The battery electric vehicle of claim 1, where the navigation system preferentially selects low speed routes by preferentially selecting congested routes at least partially according to present road congestion information.

3. The battery electric vehicle of claim 2, where the navigation system preferentially recommends low speed lanes over higher speed lanes of a given multi-lane road when the present state of charge value is insufficient to reach the destination location using shortest time or shortest distance routes.

4. The battery electric vehicle of claim 2, where the navigation system preferentially recommends exiting or avoiding high occupancy vehicle lanes when the present state of charge value is insufficient to reach the destination location using shortest time or shortest distance routes.

5. The battery electric vehicle of claim 1, where the navigation system preferentially recommends low speed lanes over higher speed lanes of a given multi-lane road when the present state of charge value is insufficient to reach the destination location using shortest time or shortest distance routes.

6. The battery electric vehicle of claim 1, where the navigation system preferentially recommends exiting or avoiding high occupancy vehicle lanes when the present state of charge value is insufficient to reach the destination location using shortest time or shortest distance routes.

7. The battery electric vehicle of claim 1, where the navigation system preferentially selects low speed routes at least partially according to route speed limit information.

8. The battery electric vehicle of claim 7, where the navigation system preferentially selects low speed routes at least partially according to present road congestion information.

9. The battery electric vehicle of claim 7, where the navigation system preferentially recommends low speed lanes over higher speed lanes of a given multi-lane road when the present state of charge value is insufficient to reach the destination location using shortest time or shortest distance routes.

10. The battery electric vehicle of claim 7, where the navigation system preferentially recommends exiting or avoiding high occupancy vehicle lanes when the present state of charge value is insufficient to reach the destination location using shortest time or shortest distance routes.

11. The battery electric vehicle of claim 7, where the navigation system is operative to determine a traveling route to direct the vehicle to a charging station or other point of interest when the present state of charge value is insufficient to reach the destination location using the low speed routes or the higher speed routes.

12. The battery electric vehicle of claim 7, where the navigation system is operative to notify a vehicle occupant via a user interface that the low speed routes are being preferentially selected over higher speed routes because the present state of charge value is insufficient to reach the destination location using shortest time or distance routes.

13. A method for determining a route for a battery electric vehicle, the method comprising:
   by at least one processor, obtaining a present state of charge value indicating a remaining amount of energy stored in the battery;
   by the at least one processor, obtaining a current vehicle location;
   by the at least one processor, obtaining a destination location;
   by the at least one processor, determining if the present state of charge value is sufficient to reach the destination location using shortest time or shortest distance routes; and
   if the present state of charge value is insufficient to reach the destination location using shortest time or shortest distance routes, by the at least one processor, determining a traveling route from the current vehicle location to the destination location by preferentially selecting low speed routes over higher speed routes.

14. The method of claim 13, comprising:
   if the present state of charge value is insufficient to reach the destination location using the low speed routes or the higher speed routes, determining a traveling route to direct the vehicle to a charging station or other point of interest.

15. The method of claim 13, comprising:
   notifying a vehicle occupant via a user interface that the low speed routes are being preferentially selected over higher speed routes because the present state of charge value is insufficient to reach the destination location using shortest time or shortest distance routes.

16. The method of claim 13, where preferentially selecting low speed routes comprises preferentially selecting congested routes at least partially according to present road congestion information.

17. The method of claim 13, comprising preferentially recommending low speed lanes over higher speed lanes of a given multi-lane road when the present state of charge value is insufficient to reach the destination location using shortest time or shortest distance routes.

18. The method of claim 13, comprising preferentially recommending exiting or avoiding high occupancy vehicle lanes when the present state of charge value is insufficient to reach the destination location using shortest time or shortest distance routes.

19. The method of claim 13, where preferentially selecting low speed routes comprises preferentially selecting low speed routes at least partially according to route speed limit information.

20. The method of claim 19, where preferentially selecting low speed routes comprises preferentially selecting congested routes at least partially according to present road congestion information.

* * * * *